(12) United States Patent
Honda et al.

(10) Patent No.: US 10,167,775 B2
(45) Date of Patent: Jan. 1, 2019

(54) AUXILIARY MACHINE DRIVE DEVICE FOR ENGINE

(71) Applicant: MAZDA MOTOR CORPORATION, Hiroshima (JP)

(72) Inventors: Kenta Honda, Aki-gun (JP); Tomohiro Koguchi, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 314 days.

(21) Appl. No.: 15/164,471

(22) Filed: May 25, 2016

(65) Prior Publication Data

US 2016/0348579 A1 Dec. 1, 2016

(30) Foreign Application Priority Data

May 29, 2015 (JP) .................................. 2015-109581

(51) Int. Cl.
*F02B 67/06* (2006.01)
*F16H 7/06* (2006.01)
(Continued)

(52) U.S. Cl.
CPC .............. *F02B 67/06* (2013.01); *F01M 1/02* (2013.01); *F02M 59/42* (2013.01); *F02M 59/44* (2013.01);
(Continued)

(58) Field of Classification Search
CPC ... F02B 67/06; F16H 7/06; F16H 7/08; F02M 59/42; F02M 59/44; F02N 15/02; F16F 15/10; F01M 1/02; F01M 2001/0269
See application file for complete search history.

(56) References Cited

U.S. PATENT DOCUMENTS

| 5,791,309 A | 8/1998 | Yamazaki et al. |
| 2003/0019459 A1 | 1/2003 | Ohsawa |

(Continued)

FOREIGN PATENT DOCUMENTS

| EP | 1741920 A2 | 1/2007 |
| EP | 1 752 645 A2 | 2/2007 |

(Continued)

OTHER PUBLICATIONS

An Office Action, "Notification of Reasons for Refusal", issued by the Japanese Patent Office on Apr. 4, 2017, which corresponds to Japanese Patent Application No. 2015-109581 and is related to U.S. Appl. No.15/164,471, with English language translation.

*Primary Examiner* — Sizo Vilakazi
(74) *Attorney, Agent, or Firm* — Studebaker & Brackett PC

(57) ABSTRACT

An auxiliary machine drive device for an engine includes a fuel pump including first and second sprockets mounted on a rear end surface of an engine body; a starter disposed below the fuel pump; a drive sprocket and a crankshaft sprocket fixed to a crankshaft; an oil pump including an oil pump sprocket disposed below the drive sprocket; an intake camshaft including an intake camshaft sprocket, and disposed on the upper side of the engine body than the fuel pump; a balancer drive shaft including a balancer shaft sprocket disposed on the exhaust side than the crankshaft and below the crankshaft; a first chain wound between the crankshaft sprocket and a first sprocket; a second chain wound between the intake camshaft sprocket and a second sprocket: and a third chain wound between the drive sprocket, the oil pump sprocket, and the balancer shaft sprocket.

6 Claims, 13 Drawing Sheets

(51) Int. Cl.
  *F16H 7/08*  (2006.01)
  *F02M 59/42* (2006.01)
  *F02M 59/44* (2006.01)
  *F16F 15/10* (2006.01)
  *F01M 1/02*  (2006.01)
  *F02N 15/02* (2006.01)

(52) U.S. Cl.
  CPC .............. *F16F 15/10* (2013.01); *F16H 7/06* (2013.01); *F16H 7/08* (2013.01); *F01M 2001/0269* (2013.01); *F02N 15/02* (2013.01)

(56) References Cited

U.S. PATENT DOCUMENTS

| | | | |
|---|---|---|---|
| 2007/0227509 A1* | 10/2007 | Ueda | F01L 1/022 |
| | | | 123/509 |
| 2011/0209680 A1* | 9/2011 | Katayama | F02B 67/06 |
| | | | 123/192.2 |
| 2018/0038274 A1* | 2/2018 | Ebesu | F02F 7/00 |

FOREIGN PATENT DOCUMENTS

| | | |
|---|---|---|
| JP | H05-332156 A | 12/1993 |
| JP | H09-210135 A | 8/1997 |
| JP | 2003-042230 A | 2/2003 |
| JP | 2005-325834 A | 11/2005 |
| JP | 2007-016715 A | 1/2007 |
| JP | 2007-023901 A | 2/2007 |
| JP | 2007-023902 A | 2/2007 |
| JP | 2007-046480 A | 2/2007 |
| JP | 2007-198160 A | 8/2007 |
| JP | 2008-111452 A | 5/2008 |

* cited by examiner

AUXILIARY MACHINE DRIVE DEVICE FOR ENGINE

BACKGROUND OF THE INVENTION

1. Field of the Invention

The present invention relates to a drive device for auxiliary machines provided in an engine for an automobile. More specifically, the present invention relates to an improvement on an auxiliary machine drive device for an engine, on a rear end portion or on a rear end surface of an engine body.

2. Background Art

An engine for an automobile is provided with a variety of auxiliary machines, Patent Literature 1 (Japanese Unexamined Patent Publication No. 2007-046480) discloses the following configuration, as an example of an auxiliary machine drive device for an engine. A first crankshaft sprocket and a second crankshaft sprocket are mounted on a crankshaft on the side opposite to the output side of the camshaft with respect to a transmission (on the front side of an engine body); a first intermediate sprocket and a second intermediate sprocket are coaxially mounted above the crankshaft; a camshaft drive lower chain is wound between a fuel pump driving sprocket disposed laterally of the crankshaft, the first crankshaft sprocket, and the second intermediate sprocket; a camshaft drive upper chain is wound between an intake camshaft drive sprocket, an exhaust camshaft drive sprocket, and the first intermediate sprocket; and a balancer shaft drive chain is wound between a balancer shaft drive chain sprocket disposed laterally of an oil pan, and the second crankshaft sprocket. In other words, the auxiliary machine drive device transmits a rotational driving force of the crankshaft to the fuel pump via the camshaft drive lower chain, and transmits a rotational driving force of the crankshaft to the balancer shaft (balancer device) via the balancer shaft drive chain. Further, the rotational driving force of the crankshaft is transmitted to an intake camshaft and to an exhaust camshaft via the camshaft drive lower chain and the camshaft drive upper chain, The auxiliary machine drive device disclosed in Patent Literature 1 is disposed on the front side of the engine body. In recent years, there is proposed a configuration, in which the auxiliary machine drive device is disposed on the rear side of an engine body i.e. on the output side of an engine with respect to a transmission. In this case, in view of a positional relationship with the transmission, there is a demand for compacting the auxiliary machine drive layout on a rear end portion or on a rear end surface of the engine body, and for suppressing an increase in the size of the engine, and consequently an increase in the weight of the engine. Particularly, the auxiliary machine drive device disclosed in Patent Literature 1 is configured to transmit a rotational driving force of the crankshaft to the camshaft, the fuel pump, and the balancer device via the camshaft drive upper chain, the camshaft drive lower chain, and the balancer shaft drive chain. These chains are offset in the axis direction of the camshaft (cylinder array direction). As a result, in the auxiliary machine drive device, the occupation space in the cylinder array direction is likely to increase.

SUMMARY OF THE INVENTION

In view of the above, an object of the present invention is to provide an auxiliary machine drive device for an engine, which enables to compact the auxiliary machine drive layout on a rear end portion or on a rear end surface of an engine body, and enables to suppress an increase in the size of the engine, and consequently, an increase in the weight of the engine.

An aspect of the present invention is directed to an auxiliary machine drive device for an engine including an engine body, the engine body being disposed in such a manner that an output side of a crankshaft with respect to a transmission in a cylinder array direction is a rear side of the engine body, and a side opposite to the rear side is a front side of the engine body. The auxiliary machine drive device includes a fuel pump including a fuel pump drive shad provided with a first sprocket and a second sprocket mounted on a rear end surface of the engine body, the fuel pump being disposed laterally and above the crankshaft when viewed in an axis direction of the crankshaft, and on a surface of a rear end portion of the engine body on an intake side; a starter disposed below the fuel pump, and configured to rotate the crankshaft when the engine is started; a drive sprocket and a crankshaft sprocket fixed to the crankshaft, and mounted on the rear end surface of the engine body; an oil pump including an of pump drive shaft provided with an oil pump sprocket mounted on the rear end surface of the engine body and disposed below the drive sprocket, the oil pump being disposed below the crankshaft; an intake camshaft including an intake camshaft sprocket mounted on the rear end surface of the engine body, the intake camshaft being disposed on an upper site of the engine body than the fuel pump; a balancer drive shaft which drives a balancer shaft for reducing vibrations of the engine due to rotation, the balancer drive shaft including a balancer shaft sprocket mounted on the rear end surface of the engine body, and disposed on an exhaust side than the crankshaft and below the crankshaft when viewed in the axis direction of the crankshaft; a first chain wound between the crankshaft sprocket and a first sprocket; a second chain wound between the intake camshaft sprocket and a second sprocket and a third chain wound between the drive sprocket, the oil pump sprocket, and the balancer shaft sprocket.

These and other objects, features and advantages of the present invention will become more apparent upon reading the following detailed description along with the accompanying drawings,

Figure 7:
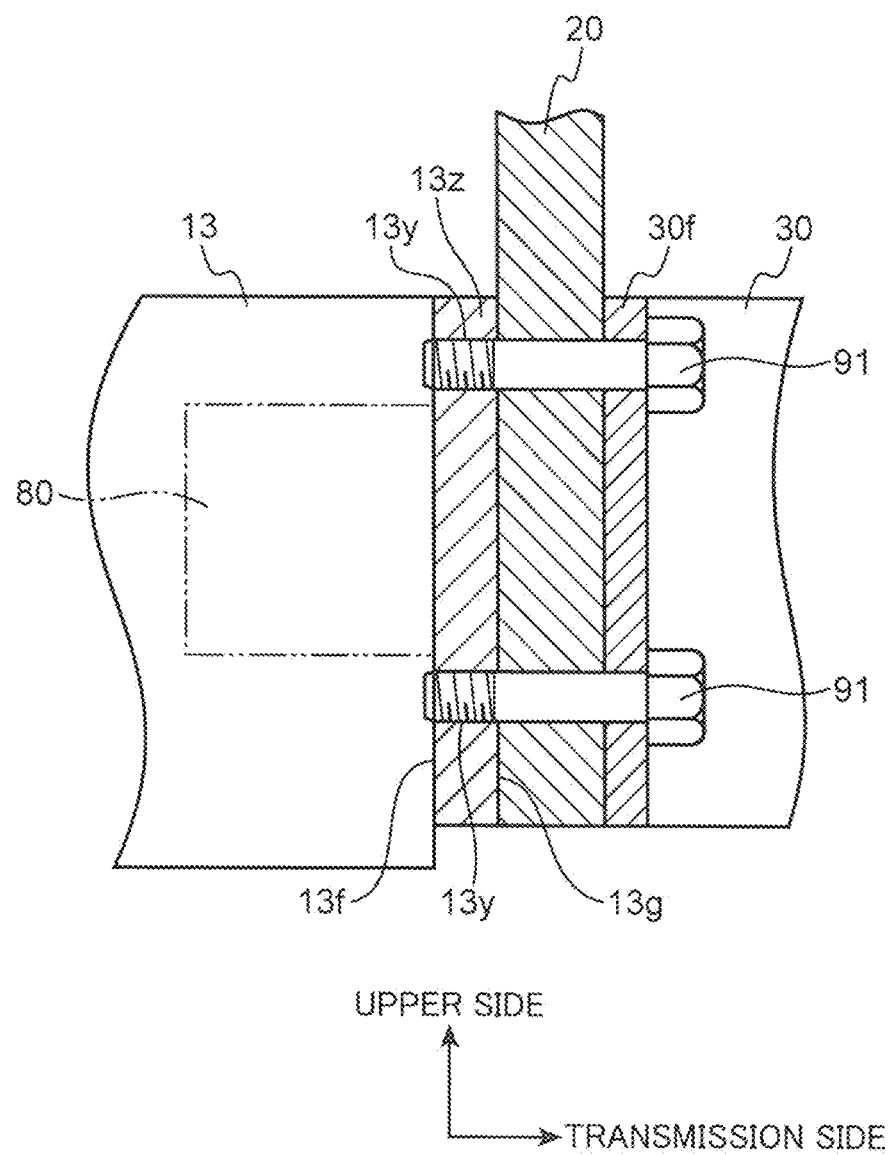
Figure 8:
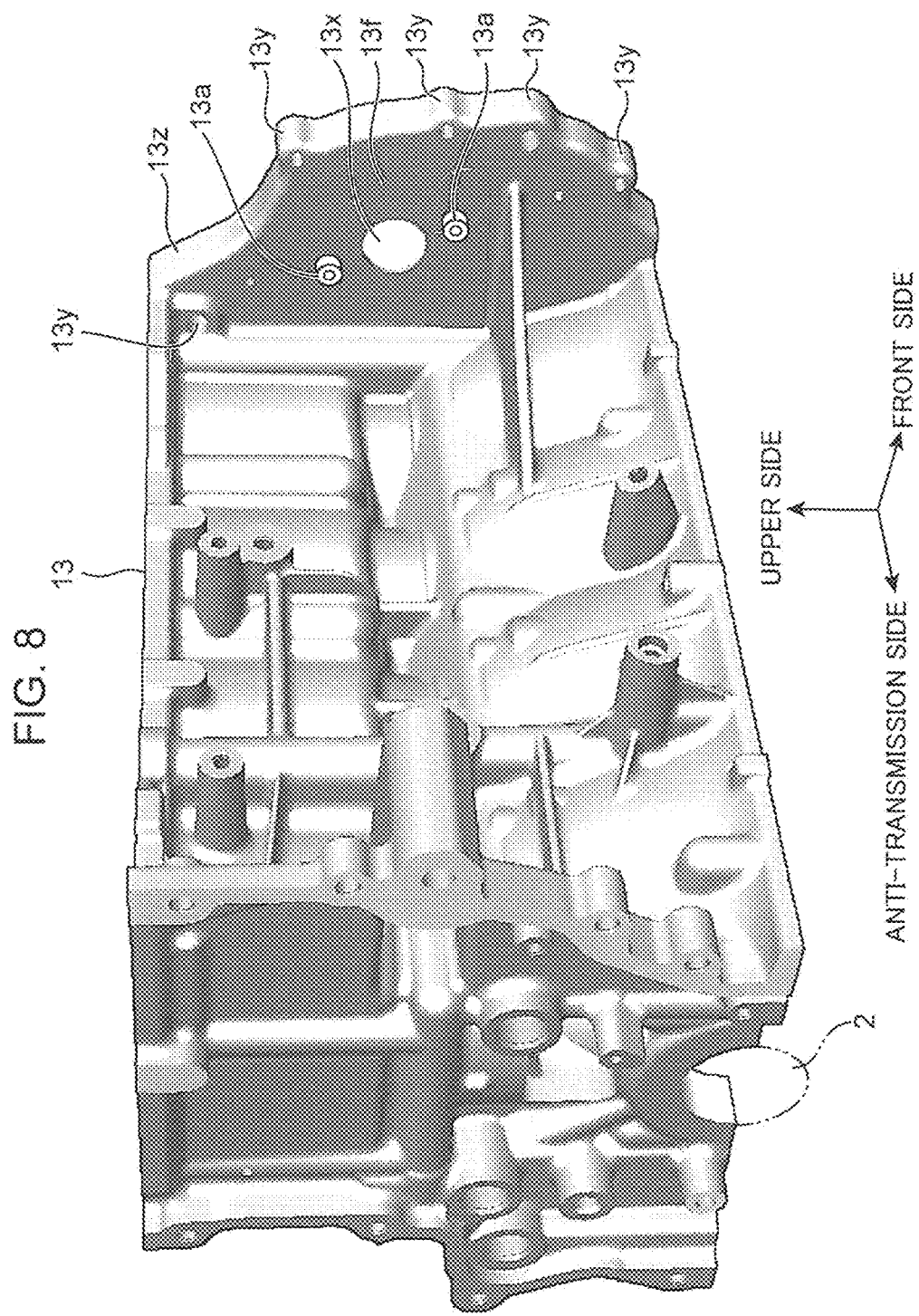
Figure 9:
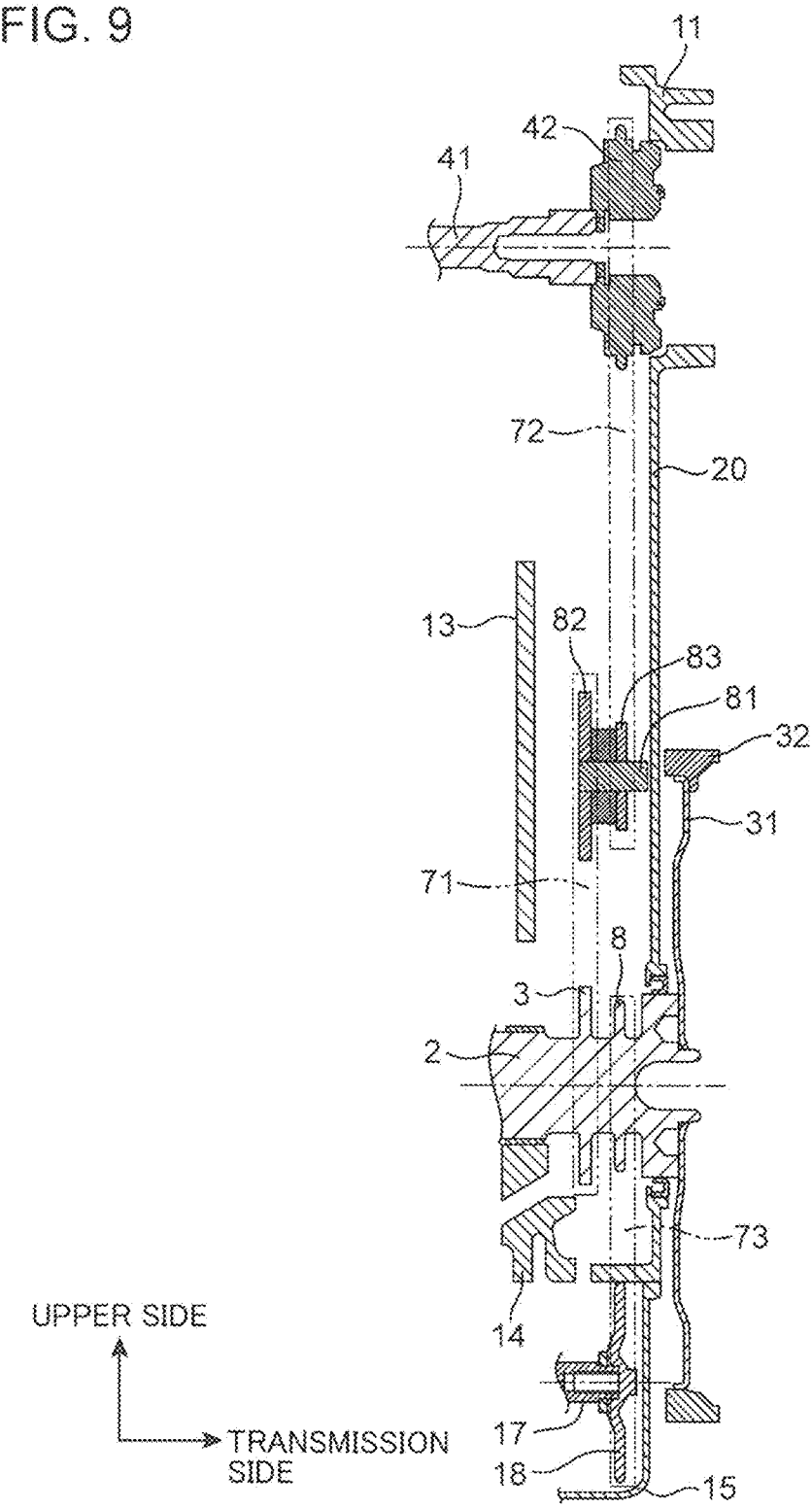
Figure 10:
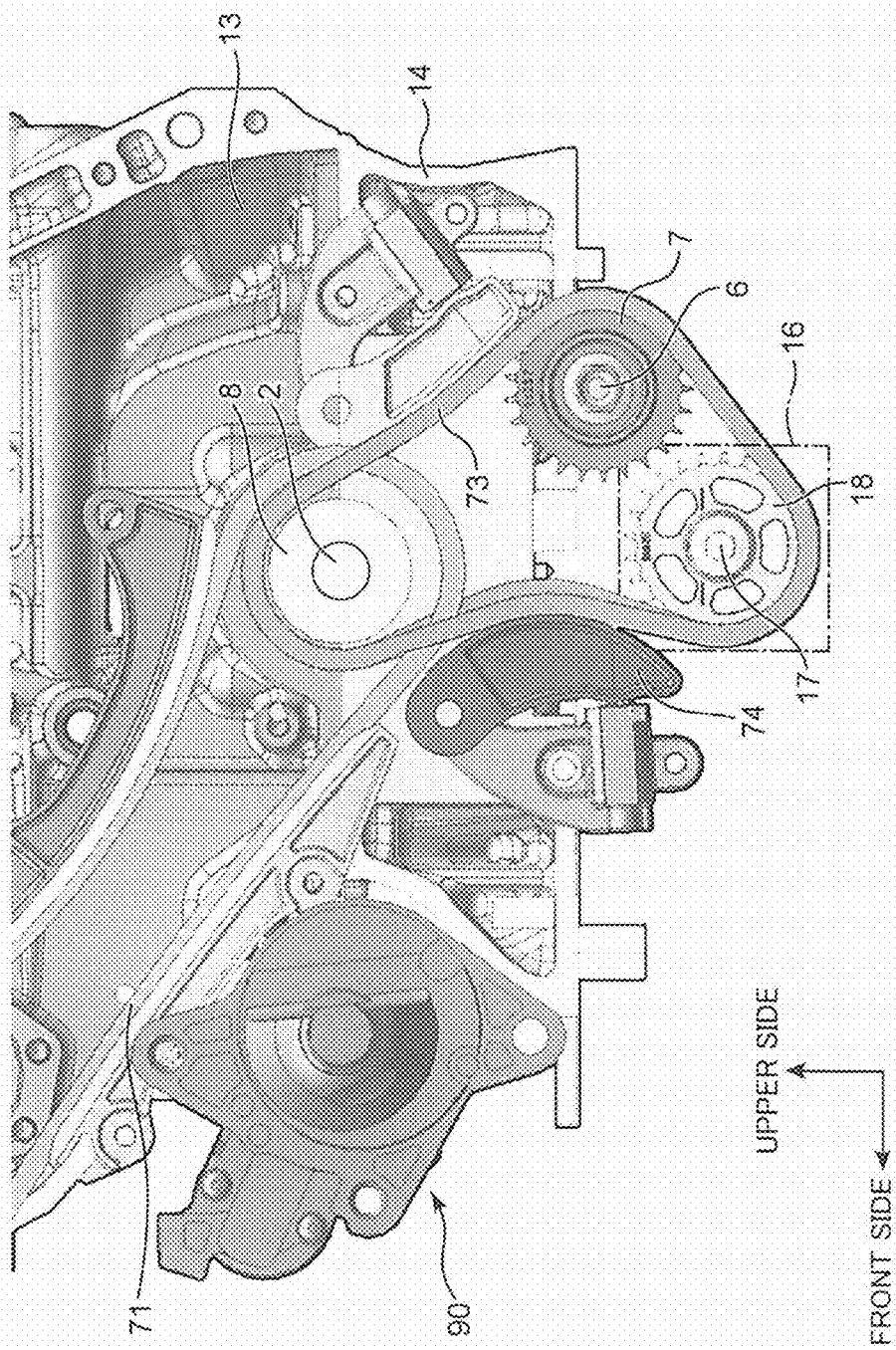
Figure 11:
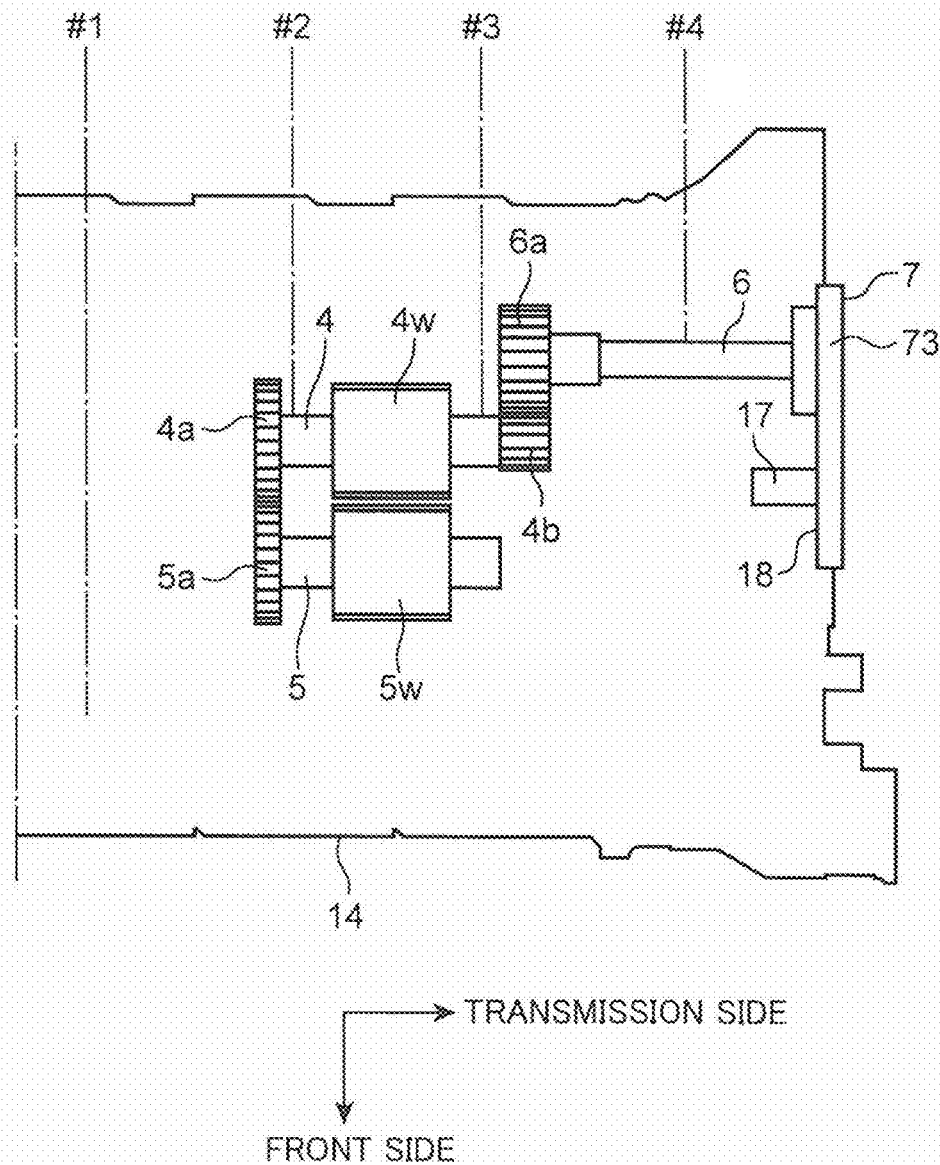
Figure 12:
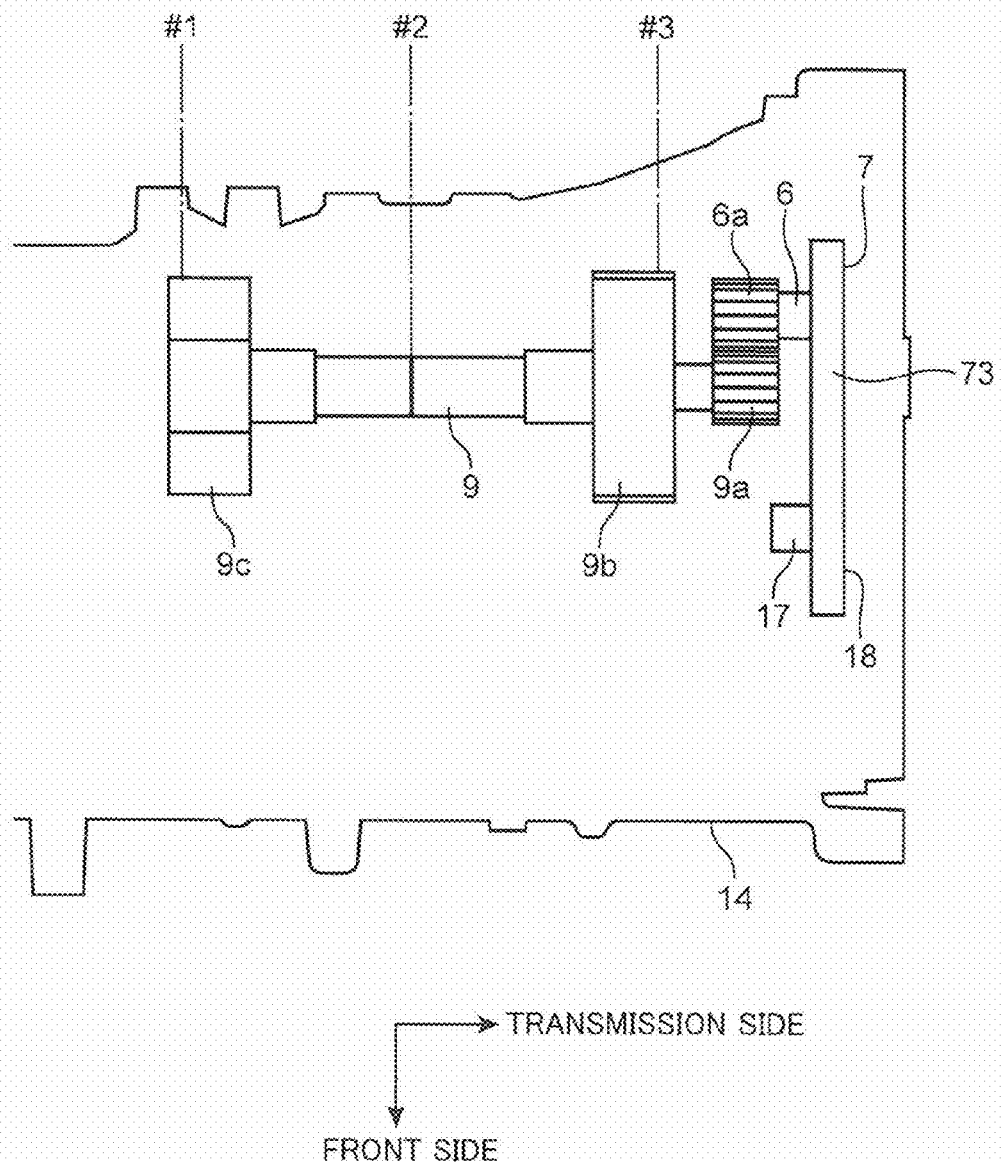
Figure 13:
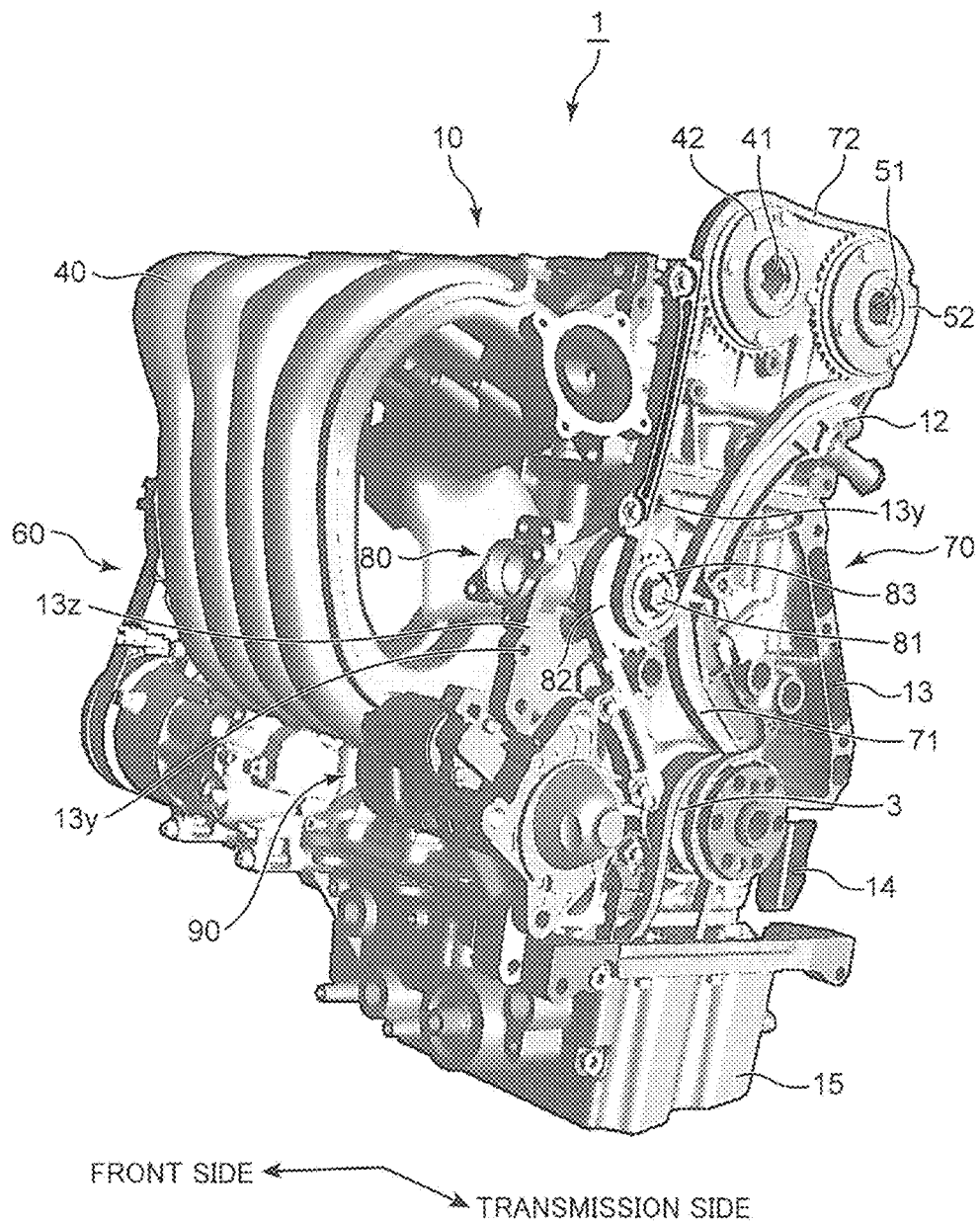

FIG to is a left side view of a cylinder block of the engine;

FIG. 7 is a schematic partially &it:National sectional view of the rear end portion of the engine body;

FIG. 8 is a perspective view of the cylinder block of the engine when viewed from the front right side;

FIG. 9 is an elevational sectional view of the rear end portion of the engine body;

FIG. 10 is a left side view at a lower portion of the rear end portion of the engine body when an oil pan is dismounted;

FIG. 11 is a plan view of second order balancer shafts to be used when the engine is an in-line 4-cylinder engine;

FIG. 12 is a plan view of a first order balancer shaft to be used when the engine is an in-line 3-cylinder engine; and FIG. 13 is a perspective view of the engine when viewed from the front left side.

DETAILED DESCRIPTION OF THE PREFERRED EMBODIMENTS OF THE INVENTION

In the following, an embodiment of the present invention is described based on the drawings.

Figure 1:
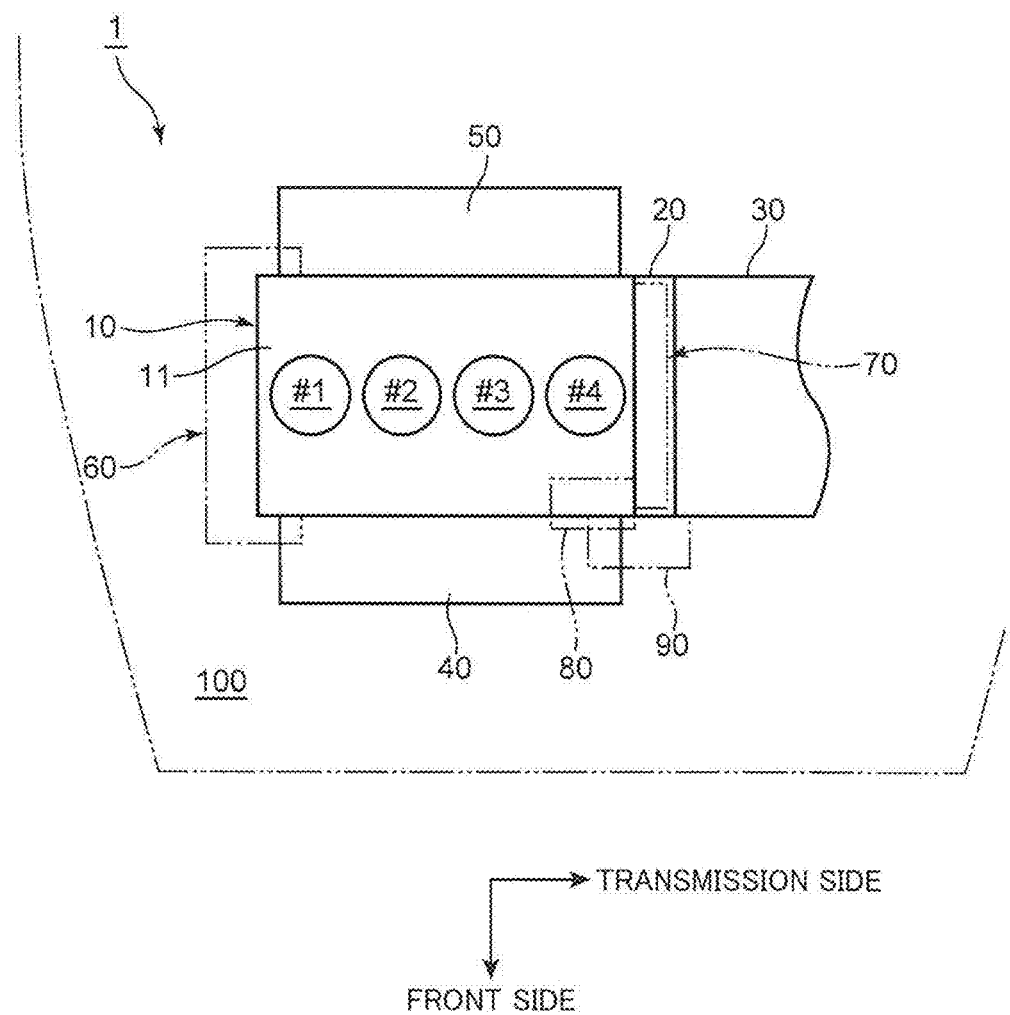
FIG. 1 is a schematic plan view of an engine in an embodiment of the present invention.
Figure 2:
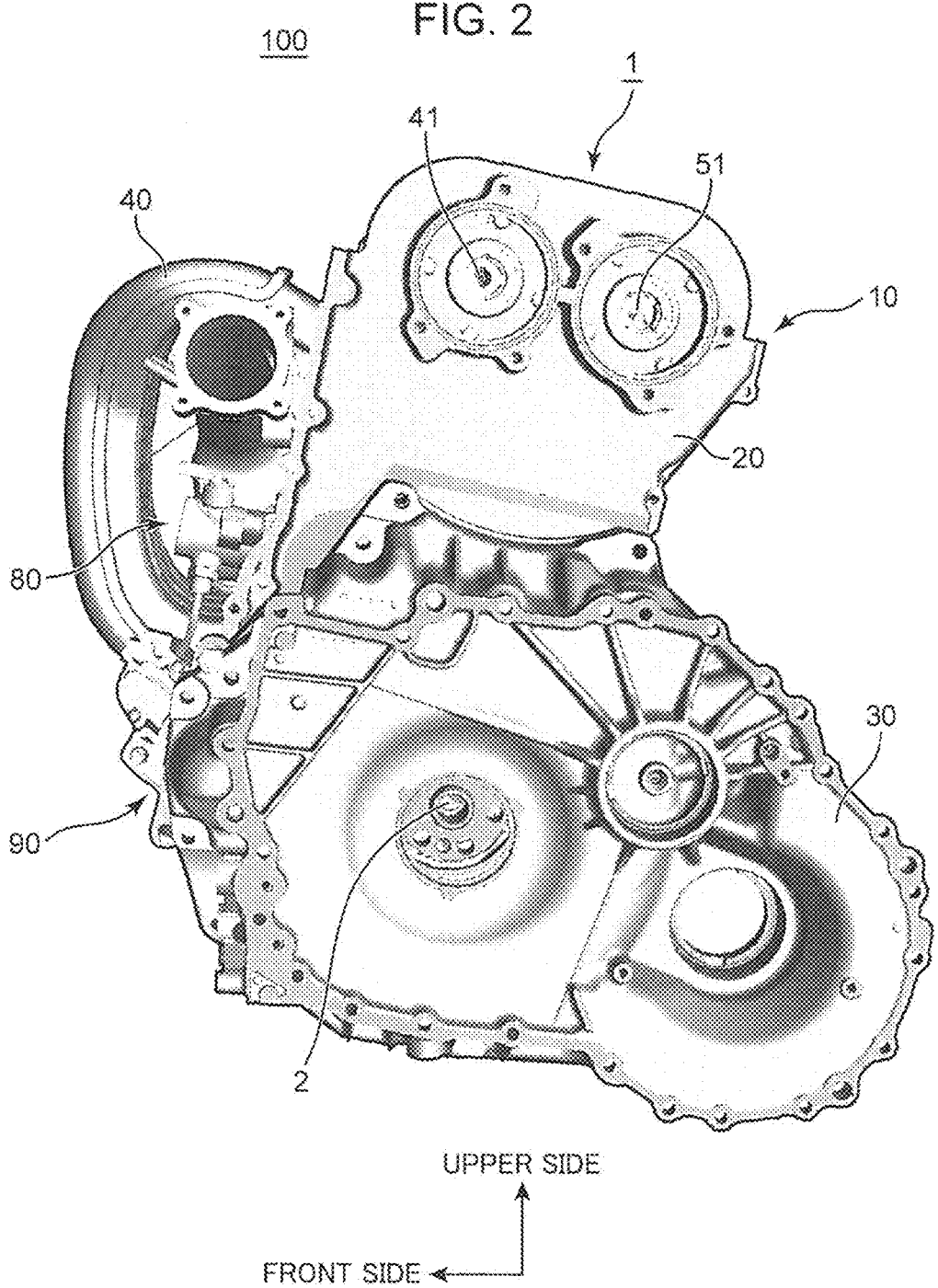
FIG. 2 is a left side view of the engine illustrating a state that a chain cover and a transmission are mounted.

As illustrated in FIG. 1 and FIG. 2, an engine 1 in the embodiment is an in-line 4-cylinder engine (provided with a first cylinder #1, a second cylinder #2, a third cylinder #3, and a fourth cylinder #4). The engine 1 is installed transversely in an engine room 100 on the vehicle front side in such a manner that the cylinder array direction is parallel to the vehicle width direction. The engine 1 is for an FF vehicle (front-engine, front-drive vehicle). Although not illustrated, the engine 1 has a well-known structure provided with pistons, injectors (fuel injection valves), intake ports, exhaust ports, intake valves, and exhaust valves on the inner side or on the outer side of the cylinders.

Figure 3:
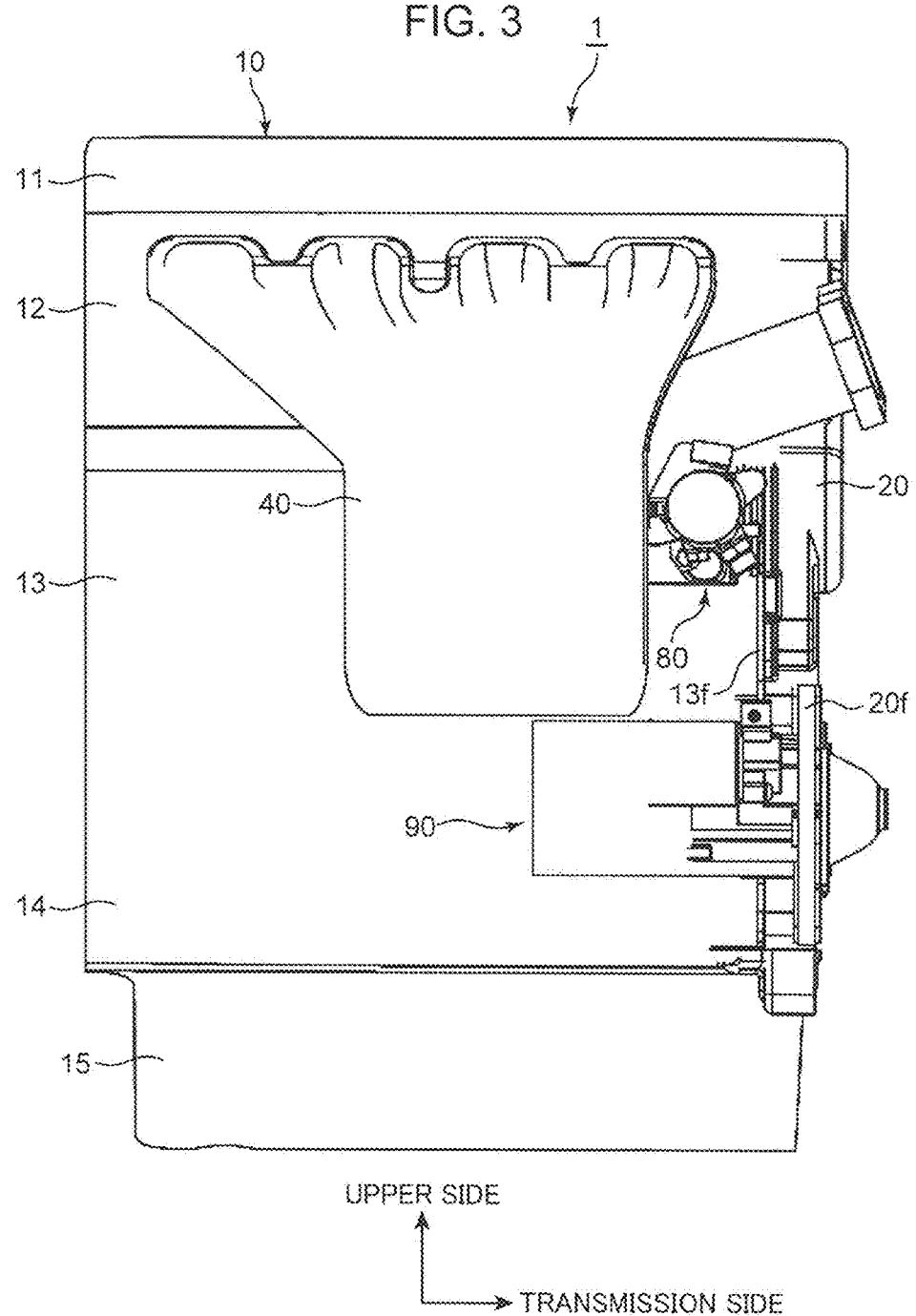
FIG. 3 is a front view of a body of the engine.
Figure 4:
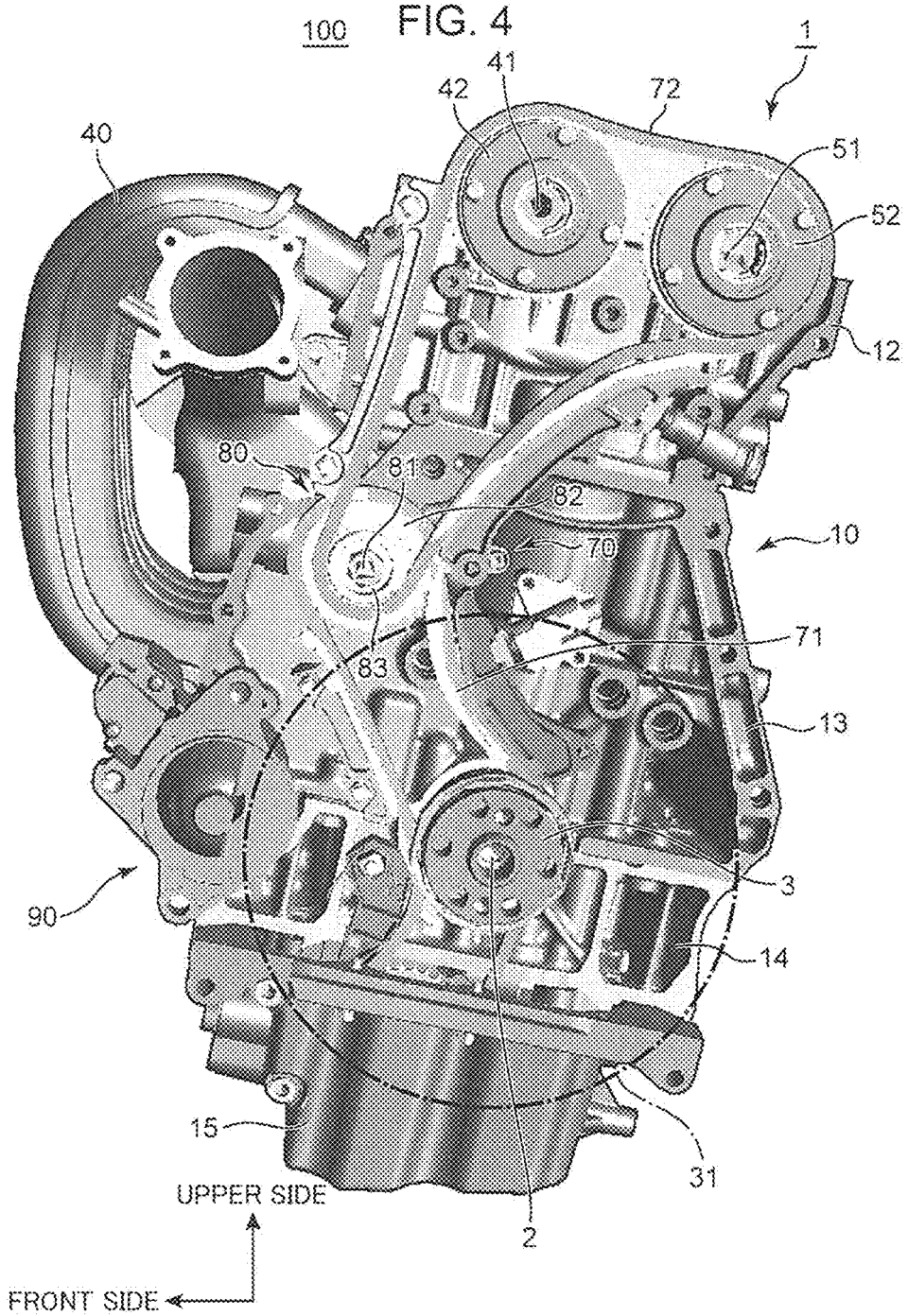
FIG. 4 is a left side view of the engine illustrating a state that the chain cover and the transmission are dismounted.

As illustrated in FIG. 3 and FIG. 4, the engine 1 includes an engine body 10. The engine body 10 includes, from the upper side in this order. a head cover 11, a cylinder head 12, a cylinder block 13, a lower block 14, and an oil pan 15. These members form an external appearance of the engine body 10. A transmission 30 is fastened to a rear end portion of the engine body 10 (in the embodiment, an end portion of the engine body 10 on the transmission side in a state that a chain cover 20 is interposed between the transmission 30 and the engine body 10 (see FIG. 1).

Note that in the following description, an output side of a crankshaft 2 with respect to the transmission 30 in the cylinder array direction, i.e., an output side of the engine body 10 is referred to as a rear side of the engine body 10, and the side opposite to the rear side of the engine body 10 is referred to as a front side of the engine body 10. Further, an end portion of the engine body 10 on the rear side of the engine body 10 is referred to as a rear end portion of the engine body 10, and an end portion of the engine body 10 on the front side of the engine body 10 is called as a front end portion of the engine body 10.

Figure 5:
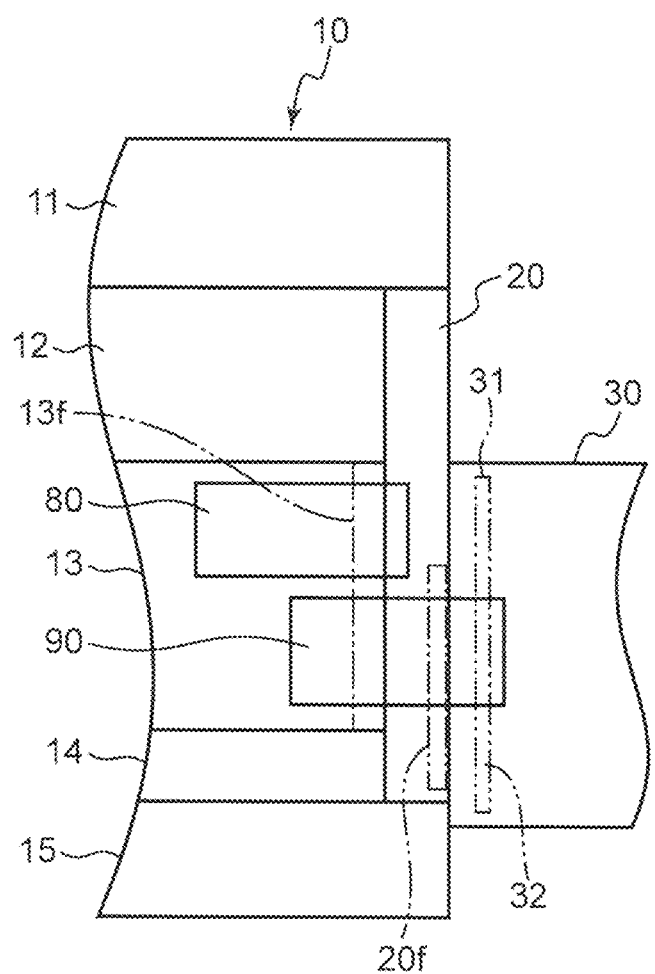
FIG. 5 is a schematic front view of a rear end portion of the engine body.

As illustrated in FIG. 5, the chain cover 20 is fastened over the cylinder had 12, the cylinder block 13, and the lower block 14. The transmission 30 is fastened over the cylinder block 13 and the lower block 14. An intake manifold 40 is connected to a side surface of the engine body 10 on the vehicle front side. An exhaust manifold 50 is connected to a side surface of the engine body 10 on the vehicle rear side (see FIG. 1). In this way, in the FF vehicle, the intake system is disposed on the vehicle front side, and the exhaust system is disposed on the vehicle rear side. This makes it possible to suppress lowering of an exhaust gas temperature due to traveling air to expedite activation of an exhaust gas purification device (not illustrated) provided in the exhaust system, and to maintain the activation.

A front-side auxiliary machine drive device 60 for belt-driving a plurality of auxiliary machines (e.g. an alternator, a compressor for an air conditioner, and a water pump) is disposed on a front end portion of the engine body 10 (in the embodiment, on an end portion of the engine body 10 on the anti-transmission side). A rear-side auxiliary machine drive device 70 for chain-driving a plurality of auxiliary machines (e.g. a fuel pump 80, an oil pump 16, and second order balancer shafts or a first order balancer shaft) is disposed on a rear end portion of the engine body 10. The rear-side auxiliary machine drive device 70 is accommodated in the chain cover 20.

The fuel pump 80 is disposed laterally on the vehicle front side on the intake side) of the engine body 10 and on the rear end portion of the engine body 10. The fuel pump 80 is disposed at the aforementioned position for the following reason. In order to enhance controllability of fuel injection as a measure for improving the fuel economy of the engine 1, which is configured to directly inject hid into a combustion chamber, high-pressure fuel injection is required. As high-pressure fuel injection is required, a required drive, torque of the fuel pump 80 for feeding fuel to the injectors in a pressure state increases. It is well known that the fuel pump 80 is disposed on an end of a camshaft 41 (51), and is driven by using a rotational force of the camshaft 41 (51). When a variable valve timing mechanism (VVT) is mounted on the camshaft 41 (51), a required drive torque of the fuel pump 80 in a high pressure state may exceed a torque generated by the variable valve timing mechanism. This may make it impossible to operate the variable valve timing mechanism. In view of the above, the fuel pump 80 is disposed at a position other than the end of the camshaft 41 (51), while avoiding a high-temperature portion such as the exhaust manifold 50. Further, in order to chain-drive the fuel pump 90 by the crankshaft 2, the fuel pump 80 is disposed on a side surface of the engine body 10 on the intake side, namely, laterally on the vehicle front side and on the rear end portion of the engine body 10 where the rear-side auxiliary machine, drive device 70 is disposed. However, when a variety of auxiliary machines are disposed above and laterally of the crankshaft 2 on the rear end portion of the engine body 10 the size of the engine 1 may increase, and the weight of the engine 1 may increase.

In view of the above, in the embodiment, the following configuration is employed in order to compact the auxiliary machine drive layout on the rear end portion or on the rear end surface of the engine body 10, and to suppress an increase in the size of the engine 1, and consequently, an increase in the weight of the engine 1.

The fuel pump 80 provided with a fuel pump drive shaft. 81 including the first sprocket 82 and the second sprocket 83 to be mounted on the rear end surface of the engine body 10 is disposed above and laterally of the crankshaft 2 when viewed in the axis direction of the crankshaft 2, and on a surface of the rear end portion of the engine body 10 on the intake side. A starter 90 for rotating the crankshaft 2 when the engine 1 is started is disposed below the fuel pump 80. A drive sprocket 8 and a crankshaft sprocket 3 are fixed to the crankshaft 2, and are mounted on the rear end surface of the engine body 10. The oil pump 16 provided with an oil pump drive shaft 17 including an oil pump sprocket 18, which is disposed below the drive sprocket 8 and mounted on the rear end surface of the engine body 10, is disposed below the crankshaft 2. An intake camshaft 41 provided with an intake camshaft sprocket 42, which is mounted on the rear end surface of the engine body 10, is disposed on the upper side of the engine body 10 than the fuel pump 80. A balancer drive shaft 6 for driving a balancer shaft to reduce vibrations of the engine 1 due to rotation, and provided with a balancer shaft sprocket 7 is disposed on the exhaust side and on the lower side than the crankshaft 2 when viewed in the axis direction of the crankshaft 2, and is mounted on the rear end surface of the engine body 10. A first chain 71 is wound between the crankshaft sprocket 3 and a first sprocket 82. A second chain 72 is wound between the intake camshaft sprocket 42 and a second sprocket 83. A third chain 73 is wound between the drive sprocket 8, the oil pump sprocket 18, and the balancer shaft sprocket 7.

Further, in the embodiment, the second chain 72 and the third chain 73 are disposed on the rear side (on the transmission side) than the first chain 71. Each of the second chain 72 and the third chain 73 is wound between the associated sprockets in a state that the second chain 72 and the third chain 73 are disposed at a same position in the cylinder array direction when viewed in a direction orthogonal to the cylinder array direction.

Specifically, as illustrated in FIG. 2, FIG. 4, and FIG. 13, the fuel pump 80 is disposed laterally on the front side and above the crankshaft 2 when viewed in the axis direction of the crankshaft 2 on the rear end portion of the engine body 10. The starter 90 is disposed below the fuel pump 80. The fuel pump 80 is disposed at a relatively upper portion of the cylinder block 13. Therefore, the fuel pump 80 is disposed in proximity to a cylinder bore (not illustrated) in the vehicle front-rear direction. On the other hand, the starter 90 is disposed at a position corresponding to the periphery of a flywheel 31 (see FIG. 5) mounted on the crankshaft 2 on the vehicle front side. In other words, the starter 90 is disposed away from the cylinder bore in the vehicle front-rear direction. Therefore, the starter 90 is disposed to project toward the vehicle front side than the fuel pump 80.

Figure 6:
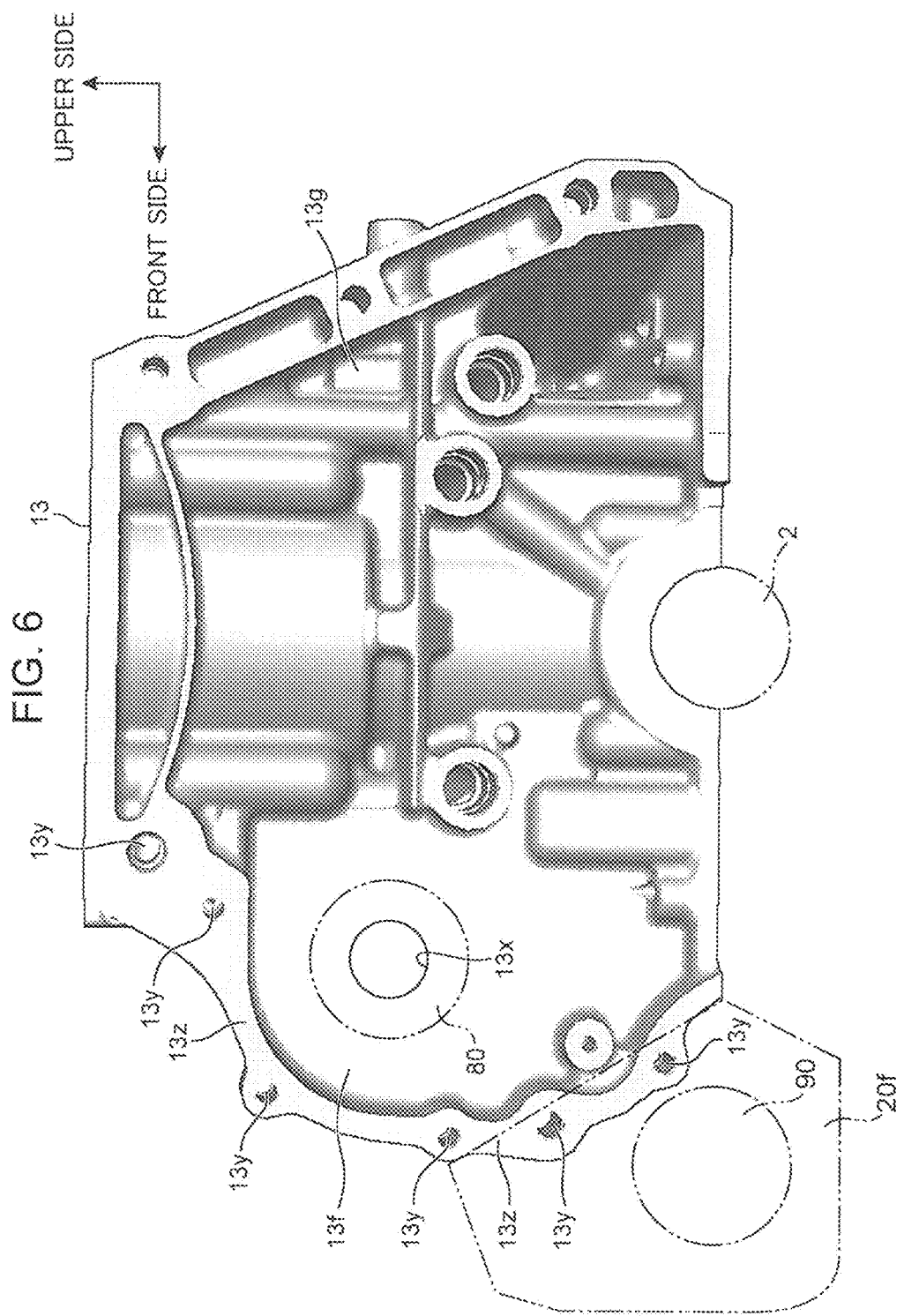

The fuel pump 80 is mounted on the cylinder block 13 (see FIG. 13). Specifically, as illustrated in FIG. 5 and FIG. 6, a flange-shaped fuel pomp mounting portion 13*f* bulging toward the vehicle front side is funned on the rear end portion of the cylinder block 13. The fuel pump 80 is mounted on the fuel pump mounting portion 13*f* from the anti-transmission side of the vehicle (see FIG. 3). A fastening bolt (not illustrated) for mounting the fuel pump 80 passes through an insertion hole formed in a mounting seat of the fuel pump 80 from the and-transmission side of the vehicle, and is engaged with the fuel pump mounting portion 13*f*.

The fuel pump 80 is chain-driven by the crankshaft 2 by the rear-side auxiliary machine drive device 70 (see FIG. 13). Specifically, the drive shaft 81 (see FIG. 4) of the fuel pump 80 passes through an opening 13*x* (see FIG. 6) formed in the fuel pump mounting portion 13*f*, and projects into the inner space of the chain cover 20. The first chain 71 is wound between the relatively large-diameter first sprocket 82 mounted on the projecting portion of the drive shaft 81, and the crankshaft sprocket 3 mounted on an end portion of the crankshaft 2 on the output side and projecting into the inner space of the chain cover 20. According to this configuration, the fuel pump 80 is chain-driven by the crankshaft 2 via the first chain 71. In FIG. 4, illustration of the teeth of the sprockets and the unit structures of the chains is omitted. This is the same for the drawing of FIG. 10.

The starter 90 is mounted on the chain cover 20. Specifically, as illustrated in FIG. 3 and FIG. 5, the flange-shaped starter mounting portion 20*f* bulging toward the vehicle front side is formed on the chain cover 20. The starter 90 is mounted on the starter mounting portion 20*f* from the anti-transmission side of the vehicle. A fastening bolt (not illustrated) for mounting the starter 90 passes through an insertion hole formed in a mounting seat of the starter 90 from the anti-transmission side of the vehicle or from the transmission side of the vehicle). The fastening bolt is engaged with the starter mounting portion 20*f*.

In the embodiment, the starter mounting portion 20*f* is formed on the chain cover 20. Alternatively, the starter mounting portion 20*f* may be formed between the rear end portion of the engine body 10, and the chain cover 20, or may be formed on a plate-shaped member (not illustrated), which is formed between the chain cover 20 and the transmission 30.

Although not illustrated in details, a pinion gear of the starter 90 passes through an opening formed in the chain cover 20, and projects into the inner space of the transmission 30. The pinion gear is engaged with a ring gear 32 formed on the periphery of the flywheel 31, which is mounted on the crankshaft 2.

As illustrated in FIG. 4, the upper portion of the engine body 10 is slanted toward the vehicle rear side by a predetermined angle. This is mainly for the purpose of securing a layout space for the intake system including the intake manifold 40 disposed on the vehicle front side.

Further, as illustrated in FIG. 4, the intake camshaft 41 and the exhaust camshaft 51 disposed at the upper portion of the cylinder head 12 are chain-driven by the crankshaft 2 by the rear-side auxiliary machine drive device 70. Specifically, the second sprocket 83 whose diameter is smaller than the first sprocket 82 is mounted on the projecting portion of the drive shaft 81 of the fuel pump 80, which projects into the inner space of the chain cover 20. The second chain 72 is wound between the second sprocket 83, the intake camshaft sprocket 42, which is mounted on the projecting portion of the intake camshaft 41 projecting into the inner space of the chain cover 20, and the exhaust camshaft sprocket 52, which is mounted on the projecting portion of the exhaust camshaft 51 projecting into the inner space of the chain, cover 20. According to this configuration, the intake camshaft 41 and the exhaust camshaft 51 are chain-driven by the crankshaft 2 via the first chain 71 and the second chain 72, which are wound around the fuel pump drive shaft 81.

In the embodiment, a transmission fastening rib 13*z* at which the transmission 30 is fastened is formed on the rear end portion of the engine body 10 (see FIG. 13). Specifically, as illustrated in FIG. 6, a transmission fastening portion 13*g* to be fastened to the transmission 30 is formed on the rear end portion of the cylinder block 13. The transmission fastening rib 13*z* is formed on the outer periphery of the transmission fastening portion 13*g*. The transmission fastening portion 13*g* has a wider area than the fuel pump mounting portion 13*f*. The entirety of the fuel pump mounting portion 13*f* is located in the area of the transmission fastening portion 13*g* when viewed in the axis direction of the crankshaft 2. The transmission 30 is mounted on the transmission fastening portion 13*g* (see FIG. 1 and FIG. 7). Fastening bolts (not illustrated for mounting the transmission 30 pass through insertion holes formed in a mounting seat of the transmission 30. The fastening bolts are respectively engaged with boss portions 13*y* formed on the transmission fastening rib 13*z*.

In the embodiment, the chain cover 20 is tightly fastened between the transmission fastening rib 13*z*, specifically, the transmission fastening portion 13*g*, and the transmission 30. Specifically, as illustrated in FIG. 7, a flange 30*f* is formed on the transmission 30. Fastening bolts 91 pass through insertion holes formed in a mounting seat of the transmission-side flange 30*f* and through insertion holes formed in a mounting seat of the chain cover 20 in a state that the chain cover 20 is interposed between the transmission-side flange 30*f*, and the transmission fastening rib 13*z* i.e. the transmission fastening portion 13*g* formed on the rear end portion of the cylinder block 13. Thus, the fastening bolts 91 are engaged with the boss portions 13*y* of the transmission fastening rib 13*z*.

In the embodiment, the intake manifold 40 is disposed laterally of the engine body 10 on the vehicle front side in such a manner that a part of the intake manifold 40 overlaps the fuel pump 80 when viewed from the vehicle front side. Specifically, as illustrated in FIG. 3, the fuel pump 80 extends in the cylinder array direction. The rear end portion of the fuel pump 80 (an end portion of the fuel pump 80 on the transmission side) projects into the inner space of the chain cover 20 and the front end portion of the fuel pump 80 projects below arches of branch pipes of the intake manifold 40 (see FIG. 2 and FIG. 4).

In the embodiment, the transmission fastening rib 13z is formed on the outer periphery of the transmission fastening portion 13g, and the boss portions 13y for receiving fastening bolts are formed on the transmission fastening rib 13z (see FIG. 4, FIG. 6, FIG. 8, and FIG. 13). In FIG. 8, the reference numeral 13a denotes a boss portion for mounting the fuel pump 80. The paired fuel pump mounting boss portions 13a are formed on the upper side and the lower side of the opening 13x for receiving the fuel pump drive shaft 81. The fuel pump mounting boss portions 13a project from the fuel pump mounting portion 13f toward the anti-transmission side of the vehicle. Fastening bolts (not illustrated) for mounting the fuel pump 80 pass through insertion holes formed in the mounting seat of the fuel pump 80 from the anti-transmission side of the vehicle. Thus, the fastening bolts are engaged with the fuel pump 80.

In the embodiment, the rear end portion of the engine body 10 is provided with the crankshaft sprocket 3 mounted on the crankshaft 2, the first sprocket 82 and the second sprocket 83 mounted on the drive shaft 81 of the fuel pump 80, the intake camshaft sprocket 42 mounted on the intake camshaft 41, the first chain 71 wound between the crankshaft sprocket 3 and the first sprocket 82, and the second chain 72 wound between the second sprocket 83 and the intake camshaft sprocket 42 (see FIG. 13).

Specifically, as illustrated in FIG. 4, FIG. 9, and FIG. 10, is the second chain 72 is wound between the intake camshaft sprocket 42 on the intake camshaft 41 and the exhaust cam shaft sprocket 52 on the exhaust camshaft 51, which are respectively located relatively above the engine body 10, and the second sprocket 83 on the fuel pump drive shaft 81 located at an intermediate portion of the engine body 10 in the up-down direction. Further, the first chain 71 wound between the first sprocket 83 on the fuel pump drive shaft 81, and the crankshaft sprocket 3 on the crankshaft 2. Furthermore, the third chain 73 is wound between the drive sprocket 8 on the crankshaft 2, the balancer shaft sprocket 7 on the balancer drive shaft 6 located relatively below the engine body 10, and the oil pump sprocket 18 on the oil pump drive shaft 17 in the oil pan 15. According to this configuration, the fuel pump 80 is chain-driven by the crankshaft 2 via the first chain 71. The intake camshaft 41 and the exhaust camshaft 51 are chain-driven by the crankshaft 2 via the first chain 71 and the second chain 72. The oil pump not illustrated) in the oil pan 15, and second order balancer shafts 4 and 5 (see FIG. 11) or a first order balancer shaft 9 (see FIG. 12) are chain-driven by the crankshaft 2 via the third chain 73.

Note that, as illustrated in FIG. 9, the intake camshaft sprocket 42, the exhaust camshaft sprocket 52, the first sprocket 82, the second sprocket 83, the crankshaft sprocket 3, the drive sprocket 8, the oil pump sprocket 18, and the balancer shaft sprocket 7 are respectively disposed on the rear end surface of the engine body 10. Further, the drive sprocket 8 is located on the transmission side than the crankshaft sprocket 3 with respect to the crankshaft 2, and the second sprocket 83 is located on the transmission side than the first sprocket 82 with respect to the drive shaft 81 of the fad pump 80. The crankshaft sprocket 3 and the first sprocket 82 are disposed at a same position in the cylinder array direction (in the left-right direction in FIG. 9) when viewed in a direction orthogonal to the cylinder array direction. The sprockets 8, 7, 18, 83, 42, and 52 other than the above are disposed at a same position in the cylinder array direction when viewed in a direction orthogonal to the cylinder array direction. Thus, the second chain 72 and the third chain 73 are disposed on the rear side (on the transmission side) than the first chain 71, and are wound between the associated sprockets in a state that the second chain 72 and the third chain 73 are located at a same position in the cylinder array direction when viewed in a direction orthogonal to the cylinder array direction.

In the embodiment, the engine 1 is an in-line 4-cylinder engine. Therefore, as illustrated in FIG. 11, the paired front and rear second order balancer shafts 4 and 5 are used. On the other hand, when the engine 1 is an in-line 3-cylinder engine, as illustrated in FIG. 12, the first order balancer shaft 9 is used. In FIG. 11 and FIG. 12, the reference numeral 6a denotes a drive gear mounted on the balancer drive shaft 6. The reference numeral 4b or 9a denotes a driven gear to be engaged with the drive gear 6a. The reference numeral 4a and 5a respectively denote a drive gear and a driven gear engageable with each other for transmitting a rotational force between the second order balancer shafts 4 and 5. In the configuration illustrated in FIG. 11, when the balancer drive shaft 6 to be chain-driven by the crankshaft 2 via the third chain 73 is rotated, the second order balancer shafts 4 and 5 are rotated, and vibrations of the engine 1 due to rotation are reduced by swinging of weights 4w and 5w provided in the balancer shafts 4 and 5. On the other hand, in the configuration illustrated in FIG. 12, when the balancer drive shaft t to be chain-driven by the crankshaft 2 via the third chain 73 is rotated, the first order balancer shaft 9 is rotated, and vibrations of the engine 1 due to rotation are reduced by swinging of weights 9b and 9c provided in the balancer shaft 9.

As is obvious from the comparison between FIG. 10 and FIG. 11 (FIG. 12), the position of the balancer drive shaft 6 does not change between the case where the second order balancer shafts 4 and 5 are used, and the case where the first order balancer shaft 9 is used. In other words, it is possible to use the common balancer drive shaft 6.

Further, in FIG. 10, the crankshaft 2 is rotated counter-clockwise. In other words, the balancer shaft sprocket 7 mounted on the balancer drive shaft 6 is disposed on the tension side of the third chain 73.

Next, the advantageous effects of the embodiment are described.

(1) in the embodiment, the auxiliary machine drive device for the engine 1 including the engine body 10 configured such that the output side of the crankshaft 2 with respect to the transmission 30 in the cylinder array direction is the rear side of the engine body 10, and the side opposite to the rear side is the front side of the engine body 10 has the following configuration. Specifically, the fuel pump 80 including the fuel pump drive shaft 81 provided with the first sprocket 82 and the second sprocket 83, which are mounted on the rear end surface of the engine body 10, is disposed laterally and above the crankshaft 2 when viewed in the axis direction of the crankshaft 2, and on a surface of the rear end portion of the engine body 10 on the intake side. The starter 90 for rotating the crankshaft 2 when the engine is started is disposed below the fuel pump 80. The drive sprocket 8 and the crankshaft sprocket 3 are fixed to the crankshaft 2, and are mounted on the rear end surface of the engine body 10.

The oil pump 16 including the oil pump drive shaft 17 provided with the oil pump sprocket 18, which is mounted on the rear end surface of the engine body 10 and disposed below the drive sprocket 8, is disposed below the crankshaft 2. The intake camshaft 41 provided with the intake camshaft sprocket 42, which is mounted on the rear end surface of the engine body 10, is disposed on the upper side of the engine body 10 than the fuel pump 80. The balancer drive shaft 6 for driving a balancer shaft to reduce vibrations of the engine 1 due to rotation and provided with the balancer shaft sprocket 7 is disposed on the exhaust side than the crankshaft 2 and below the crankshaft when viewed in the axis direction of the crankshaft 2 on the rear end surface of the engine body 10. The first chain 71 is wound between the crankshaft sprocket 3 and the first sprocket 82. The second chain 72 is wound between the intake camshaft sprocket 42 and the second sprocket 83. The third chain 73 is wound between the drive sprocket 8, the oil pump sprocket 18, and the balancer shaft sprocket 7.

According to the aforementioned configuration, the fuel pump 80, the starter 90, the drive sprocket 8, the oil pump sprocket 18 (oil pump 16), and the balancer shaft sprocket 7 are disposed in a veil balanced state while being associated with each other with respect to the crankshaft 2 on the rear end portion or on the rear end surface of the engine body 10. In particular, these members are disposed in a space, which is long in the front-rear direction of the engine 1 (in the cylinder array direction), and narrow in the engine width direction, with a shape similar to the shape of the engine body 10. This is advantageous in suppressing an increase in the size of the engine 1, and consequently, an increase in the weight of the engine 1.

Further, since the fuel pump 80 is disposed on the surface of the engine body 10 on the intake side, there is no likelihood that the fuel pump 80 having a large drive load may be exposed to high-temperature exhaust gas. This is advantageous in avoiding a temperature increase of the fuel pump 80. In addition to the above, the fuel pump 80 is chain-driven by the crankshaft 2 via the first chain 71. The intake camshaft 41 is chain-driven by the crankshaft 2 via the first chain 71 and the second chain 72. In this configuration, since the fuel pump 80 is disposed on the intake side, the winding angle of the second chain 72 with respect to the intake camshaft sprocket 42 is smaller than the winding angle of the second chain 72 with respect to the exhaust camshaft sprocket 52. The second chain 72 is wound around the intake camshaft sprocket 42 even in this condition. Thus, it is possible to drive both of the intake camshaft 41 and the exhaust camshaft 51 by the second chain 72. This does not require a gear between the intake camshaft 41 and the exhaust camshaft 51, and eliminates gear noise.

(2) In the embodiment, the second chain 72 and the third chain 73 are disposed on the rear side than the first chain 71. Each of the second chain 72 and the third chain 73 is wound between the associated sprockets such as the sprocket 8 to a state that the second chain 72 and the third chain 73 are disposed at a same position in the cylinder array direction when viewed in a direction orthogonal to the cylinder array direction. This is advantageous in suppressing an increase in the wire of the engine 1 in the front-rear-direction of the engine in the cylinder array direction). Specifically, as illustrated in FIG. 9, the second chain 72 and the third chain 73 are disposed at a same position in the cylinder array direction when viewed in a direction orthogonal to the cylinder array direction. This is advantageous in suppressing an increase in the size of the engine 1 in the front-rear direction of the engine 1, as compared with a configuration, in which all the chains 71 to 73 are disposed at positions offset from each other In the cylinder array direction.

In the embodiment, the second chain 72 and the third chain 73 are disposed on the rear side than the first chain 71. Alternatively, the second chain 72 and the third chain 73 may be disposed on the front side. Also in the aforementioned configuration, it is possible to provide substantially the same advantageous effects as described above.

(3) In the embodiment, the auxiliary machine drive device is provided with the chain tensioner 74, which is disposed laterally on the front side of the crankshaft 2 when viewed in the axis direction of the crankshaft 2, and is mounted between the drive sprocket 8 and the oil pump sprocket 18; the chain cover 20 mounted on the rear end portion of the engine body 10, and configured to accommodate the drive sprocket 8, the oil pump sprocket 18, the balancer shaft sprocket 7, the third chain 73, and the chain tensioner 74 therein; and the starter mounting portion 20f formed on the chain cover 20 and configured to mount the starter 90 thereon. According to this configuration, it is possible to dispose the drive sprocket 8, the oil pump sprocket 18, the balancer shaft sprocket 7, and the chain tensioner 74 in a well balanced state while associating these members with each other. In particular, it is possible to dispose these members in a narrow space in the front-rear direction of the engine 1 (in the cylinder array direction). This makes it possible to secure scalability of the chain cover 20 with respect to the engine body 10, without increasing the thickness of the left wall and the right wall of the chain cover 20 for accommodating these members therein. Further, it is possible to mount the starter 90 on the rear end portion of the engine both 10 in a compact manner by effectively using the chain cover 20.

(4) In the embodiment, the balancer shaft sprocket 7 is disposed on the tension side of the third chain 73. Therefore, the balancer shaft sprocket 7 is synchronously rotated with the crankshaft 2. This is advantageous in reducing vibrations of the engine I due to rotation by the second order balancer shafts 4 and 5 or by the first order balancer shaft 9). Further, although the second order balancer shafts 4 and 5 (or the first order balancer shaft 9 may also generate a vibration force, it is possible to suppress generation of a vibration force of the second order balancer shafts 4 and 5 (or of the first order balancer shaft 9), because the second order balancer shafts 4 and 5 (or the first order balancer shaft 9) are located on the tension side of the third chain 73.

(5) in the embodiment, the auxiliary machine drive device is provided with the paired second order balancer shafts 4 and 5, which are aligned to each other in a direction orthogonal to the cylinder array direction, and are respectively provided with a drive gear 4a and a driven gear 5a. Each of the second order balancer shafts 4 and 5 extends in the cylinder array direction, and the gears of the second order balancer shafts 4 and 5 are engageable with each other. A rotational driving force of the balancer drive shaft 6 is transmitted from the balancer drive shaft 6 to the second order balancer shaft 4 for driving the paired second order balancer shafts 4 and 5. According to the aforementioned configuration, it is possible to drive the paired second order balancer shafts 4 and 5 by the balancer shaft sprocket 7. This is advantageous in remarkably compacting the auxiliary machine drive layout, as compared with a configuration, in which each of second order balancer shafts 4 and 5 is provided with a driven sprocket for chain Further, in the embodiment, the balancer drive shaft 6 is commonly used between the second-order balancer shafts 4 and 5, and the first order balancer shaft 9, which are selectively used depending on a difference in the number of cylinders. The balancer drive shaft 6 is provided with the balancer shaft sprocket 7. This makes it possible to compact the auxiliary machine drive layout, as compared with a configuration, in which a dedicated balancer drive shaft 6 is individually provided for second order balancer shafts 4 and 5, and for a first order balancer shaft 9, and a driven sprocket is provided for the balancer drive shaft 6 for chain-driving.

As described above, the present invention is described in details by the embodiment. The present invention, however, is not limited to the embodiment. For instance, in the embodiment, the entirety of the fuel pump mounting portion 13*f* is located within the area of the transmission fastening portion 13*g* when viewed in the axis direction of the crankshaft 2. Alternatively, a part of the fuel pump mounting portion 13*f* may be located within the area of the transmission fastening portion 13*g* when viewed in the axis direction of the crankshaft 2. Further, the arrangement position of the engine and the type or model of the vehicle are not specifically limited. For instance, the embodiment is described based on the premise that the vehicle is an FF vehicle with a transversely disposed engine, in which the intake system is disposed on the vehicle front side and the exhaust system is disposed on the vehicle rear side. Alternatively, the vehicle may be an FF vehicle provided with a vertically disposed engine. Further alternatively, the vehicle may be an FF vehicle provided with a transversely disposed engine, in which the intake system is disposed on the vehicle rear side, and the exhaust system is disposed on the vehicle front side. Further, the balancer shaft is riot limited to a first order balancer shaft or second order balancer shafts.

The following is a summary of the present invention.

An aspect of the present invention is directed to an auxiliary machine drive device for an engine including an engine body, the engine body being disposed in such a manner that an output side of a crankshaft: with respect to a transmission in a cylinder array direction is a rear side of the engine body, and a side opposite to the rear side is a front side of the engine body. The auxiliary machine drive device includes a fuel pump including a fuel pump drive shaft provided with a first sprocket and a second sprocket mounted on a rear end surface of the engine body, the fuel pump being disposed laterally and above the crankshaft when viewed in an axis direction of the crankshaft, and on a surface of a rear end portion of the engine body on an intake side; a starter disposed below the fuel pump, and configured to rotate the crankshaft when the engine is started; a drive sprocket and a crankshaft sprocket fixed to the crankshaft, and mounted on the rear end surface of the engine body; an oil pump including an oil pump drive shaft provided with an oil pump sprocket mounted on the rear end surface of the engine body and disposed below the drive sprocket, the oil pump being disposed below the crankshaft; an intake camshaft including an intake camshaft sprocket mounted on the rear end surface of the engine body, the intake camshaft being disposed on an upper side of the engine body than the fuel pump; a balancer drive shaft which drives a balancer shall for reducing vibrations of the engine due to rotation, the balancer drive shaft including a balancer shaft sprocket mounted on the rear end surface of the engine body, and disposed on an exhaust side than the crankshaft and below the crankshaft when viewed in the axis direction of the crankshaft; a first chain wound between the crankshaft sprocket and a first sprocket; a second chain wound between the intake camshaft sprocket and a second sprocket; and a third chain wound between the drive sprocket, the oil pump sprocket, and the balancer shaft sprocket.

According to the aforementioned configuration, the fuel pump, the starter, the drive sprocket, the oil pump sprocket (oil pump), and the balancer shaft sprocket are disposed in a well-balanced state while being associated with each other on the rear end portion or on the rear end surface of the engine body. In particular, these members are disposed in a space, which is long in the front-rear direction of the engine (in the cylinder array direction) and narrow in the engine width direction, with a shape similar to the shape of the engine body. This is advantageous in suppressing an, increase in the size of the engine, and consequently, an increase in the weight of the engine.

Further, the fuel pump is disposed on the surface of the engine hod on the intake side. Therefore., there is no likelihood that the fuel pump having a large drive load may be exposed to high-temperature exhaust gas. This is advantageous in avoiding a temperature increase of the fuel pump. In addition to the above, the fuel pump is chain-driven by the crankshaft via the first chain. The intake camshaft is chain-driven by the crankshaft via the first chain and the second chain. In this configuration, since the fuel pump is disposed on the intake side, the winding angle of the second chain with respect to the intake camshaft sprocket is smaller than the winding angle of the second chain with respect to the exhaust camshaft sprocket. The second chain, is wound around the intake camshaft sprocket even in this condition. Thus, it is possible to drive both of the intake camshaft and the exhaust camshaft by the second chain. This does not require a gear between the intake camshaft and the exhaust camshaft, and eliminates gear noise.

In the auxiliary machine drive device, preferably, the second chain and the third chairs may be disposed on the rear side or on the front side than the first chain, and each of the second chain and the third chain may be wound between the associated sprockets in a state that the second chain and the third chain are disposed at a same position in the cylinder array direction when viewed in a direction orthogonal to the cylinder array direction.

According to the aforementioned configuration, the second chain and the third chain are disposed at the same position in the cylinder array direction when viewed in a direction orthogonal to the cylinder array direction. Therefore, the aforementioned configuration is advantageous in suppressing an increase in the size of the engine in the front-rear direction of the engine, as compared with a configuration, in which all the first to third chains are disposed at positions offset from each other in the cylinder array direction.

Preferably, the auxiliary machine drive device may be further provided with a chain tensioner disposed laterally of the crankshaft when viewed in the axis direction of the crankshaft, and between the drive sprocket and the oil pump sprocket; a chain cover mounted on the, rear end portion of the engine body, and configured to accommodate the drive sprocket, the oil pump sprocket, the balancer shaft sprocket, the third chain, and the chain tensioner therein; and a starter mounting portion formed on the chain cover, and configured to mount the starter thereon.

According to the aforementioned configuration, the drive sprocket, the oil pump sprocket, the balancer shaft sprocket, and the chain tensioner are disposed in a well-balanced state while being associated with each other. In particular, it is possible to dispose these members in a narrow space in the front-rear direction of the engine (in the cylinder array direction). This makes it possible to secure scalability of the chain cover with respect to the engine body, without increasing the thickness of the left wall and the right wall of the chain cover for accommodating these members therein. Further, it is possible to mount the starter on the rear end portion of the engine body in a compact manner by effectively using the chain cover.

In the auxiliary machine drive device preferably, the balancer shaft sprocket may be mounted on a tension side of the third chain.

According to the aforementioned configuration, it is possible to synchronously rotate the balancer shaft sprocket with the crankshaft. This is advantageous in reducing vibrations of the engine due to rotation by the balancer shaft. Further, although the balancer shaft may also generate a vibration force, it is possible to suppress generation of a vibration forcer the balancer shaft, because the balancer shaft is located on the tension side of the third chain.

In the auxiliary machine drive device, preferably, the engine body may be an engine body of an in-line 4-cylinder engine. The balancer shaft may include a pair of second order balancer shafts aligned to each other in a direction orthogonal to the cylinder array direction, each of the second order balancer shafts extending in the cylinder array direction and being provided with a gear, the gears of the second order balancer shafts being engageable with each other. The balancer drive shaft may transmit a rotational driving force thereof to either one of the second order balancer shafts.

According to the aforementioned configuration, it is possible to drive the second order balancer shafts by the balancer shaft sprocket. Therefore, the aforementioned configuration is advantageous in remarkably compacting the auxiliary machine drive layout, as compared with a configuration, in which each of second order shafts is provided with a driven sprocket, and a fuel pump is chain-driven.

Note that in the auxiliary machine drive device, when the engine body is an engine body of an in-line 3-cylinder engine, preferably, the balancer shall may be a first order balancer shaft extending in the cylinder array direction, arid configured to rotate by receiving a rotational driving force from the balancer drive shaft.

This application is based on Japanese Patent Application No. 2015-109581 filed on May 29, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An auxiliary machine drive device for an engine including an engine body, the engine body being disposed in such a manner that an output side of a crankshaft with respect to a transmission in a cylinder array direction a rear side of the engine body, and a side opposite to the rear side is a front side of the engine body, the auxiliary machine drive device comprising:
   a fuel pump including a fuel pump drive shaft provided with a first sprocket and a second sprocket mounted on a rear end surface of the engine body, the fuel pump being disposed laterally and above the crankshaft when viewed in an axis direction of the crankshaft, and on a surface of a rear end portion of the engine body on an intake side;
   a starter disposed below the fuel pump, and configured to rotate the crankshaft when the engine is started;
   a drive sprocket and a crankshaft sprocket fixed to the crankshaft, and mounted on the rear end surface of the engine body;
   an oil pump including an oil pump drive shaft provided with an oil pump sprocket mounted on the rear end surface of the engine body and disposed below the drive sprocket the oil pump being disposed below the crankshaft;
   an intake camshaft including an intake camshaft sprocket mounted on the rear end surface of the engine body, intake camshaft being disposed on an upper side of the engine body than the fuel pump;
   a balancer drive shaft which drives a balancer shaft for reducing vibrations of the engine due to rotation, the balancer drive shaft including a balancer shaft sprocket mounted the rear end surface of the engine body, and disposed on an exhaust side than the crankshaft and below the crankshaft when viewed in t the axis direction of the crankshaft;
   a first chain wound between the crankshaft sprocket and a first sprocket;
   a second chain wound between the intake camshaft sprocket and a second sprocket; and
   a third chain wound between the drive sprocket, the oil pump sprocket, and the balancer shaft sprocket.

2. The auxiliary machine drive device Par an engine according to claim 1, wherein
   the second chain, and the third chain are disposed on the rear side or on the front s de than the first chain, and
   each of the second chain and the third chain is wound between the associated sprockets in a state that the second chain and the third chain are disposed at a same position in the cylinder array direction when viewed in a direction orthogonal to the cylinder array direction.

3. The auxiliary machine drive device for an engine according to claim 1, further comprising;
   a chain tensioner disposed laterally of the crankshaft when viewed in the axis direction of the crankshaft, and between the drive sprocket and the oil pump sprocket;
   a chain cover mounted on the rear end portion of the engine body, and configured to accommodate the drive sprocket, the oil pump sprocket, the balancer shaft sprocket, the third chain, and the chain tensioner therein; and
   a starter mounting portion formed on the chain cover, and configured to mount the starter thereon.

4. The auxiliary machine drive device for an engine according to claim 1, wherein
   the balancer shaft sprocket is mounted on a tension side of the third chain.

5. The auxiliary machine drive device for an engine according to claim 1, wherein
   the engine body is an engine body of an in-line 4-cylinder engine,
   the balancer shaft includes a pair of second order balancer shafts aligned to each other in a direction orthogonal to the cylinder array direction, each of the second order balancer shafts extending in the cylinder array direction and being provided with a gear, the gears of the second order balancer shafts being engage,able with each other; and
   the balancer drive shaft transmits a rotational driving force thereof to either one of the second order balancer shafts.

6. The auxiliary machine drive device for an engine according to claim 1, wherein the engine body is an engine body of an in-line 3-cylinder engine, and the balancer shaft is a first order balancer shaft extending in the cylinder array direction, and configured to rotate by receiving a rotational driving force from the balancer drive shaft.

\* \* \* \* \*